United States Patent
Zhang et al.

(10) Patent No.: US 11,143,036 B1
(45) Date of Patent: Oct. 12, 2021

(54) TURBINE BLADE WITH FRICTION AND IMPACT VIBRATION DAMPING ELEMENTS

(71) Applicant: General Electric Company, Schenectady, NY (US)

(72) Inventors: James Zhang, Simpsonville, SC (US); Michael Anthony Wondrasek, Greenville, SC (US); John McConnell Delvaux, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/998,207

(22) Filed: Aug. 20, 2020

(51) Int. Cl.
*F01D 5/16* (2006.01)
*F01D 5/22* (2006.01)

(52) U.S. Cl.
CPC .............. *F01D 5/16* (2013.01); *F01D 5/225* (2013.01); *F05D 2220/30* (2013.01); *F05D 2260/96* (2013.01)

(58) Field of Classification Search
None
See application file for complete search history.

(56) References Cited

U.S. PATENT DOCUMENTS

| | | | |
|---|---|---|---|
| 2,689,107 A * | 9/1954 | Odegaard | F01D 5/16 416/233 |
| 2,999,669 A * | 9/1961 | McGinnis | F01D 5/16 416/229 R |
| 3,754,838 A * | 8/1973 | Fu | F01D 5/16 416/145 |
| 3,758,233 A | 9/1973 | Cross et al. | |
| 3,893,782 A | 7/1975 | Pierpoline et al. | |
| 4,531,362 A | 7/1985 | Barry et al. | |
| 4,776,216 A | 10/1988 | Barton et al. | |
| 5,165,860 A * | 11/1992 | Stoner | F01D 5/26 416/224 |
| 5,215,442 A | 6/1993 | Steckle et al. | |
| 5,256,031 A | 10/1993 | Bothien et al. | |
| 5,284,011 A * | 2/1994 | Von Benken | F01D 5/26 60/796 |

(Continued)

FOREIGN PATENT DOCUMENTS

EP 0077987 A1 5/1983

*Primary Examiner* — Ninh H. Nguyen
*Assistant Examiner* — Jason Fountain
(74) *Attorney, Agent, or Firm* — Charlotte C. Wilson; Hoffman Warnick LLC (57) ABSTRACT

A turbine blade includes an airfoil body having an outer tip and a platform; and a part-span shroud positioned between the outer tip and the platform of the airfoil body. The part-span shroud has a first opening extending through the airfoil body and having a first inner surface. The airfoil body includes a second opening extending radially from the first opening and having a second inner surface. A first elongated vibration-damping element is disposed in the first opening, and a second elongated vibration-damping element disposed radially in the second opening. The second elongated vibration-damping element includes a free radially outer end and a radially inner end coupled to the first elongated vibration-damping element. The first elongated vibration-damping element frictionally damps vibration, and the second elongated vibration-damping element damps vibration using impact within the second opening.

20 Claims, 6 Drawing Sheets

(56) References Cited

U.S. PATENT DOCUMENTS

| | | | |
|---|---|---|---|
| 6,171,058 B1 | 1/2001 | Stec | |
| 6,676,380 B2 | 1/2004 | Davis et al. | |
| 6,827,551 B1 | 12/2004 | Duffy et al. | |
| 7,296,977 B2 | 11/2007 | Bonnet | |
| 7,300,256 B2 * | 11/2007 | Masserey | F01D 5/16 416/230 |
| 8,061,997 B2 | 11/2011 | Le Hong et al. | |
| 8,684,692 B2 * | 4/2014 | Mayer | F01D 5/187 416/97 R |
| 8,790,082 B2 * | 7/2014 | Merrill | B22C 9/10 416/96 R |
| 9,631,500 B2 * | 4/2017 | Pierre | F01D 25/12 |
| 10,697,303 B2 * | 6/2020 | Blaney | F01D 9/041 |
| 2006/0040096 A1 | 2/2006 | Eadara et al. | |
| 2007/0081894 A1 | 4/2007 | Garner | |
| 2007/0081901 A1 | 4/2007 | Wagner et al. | |
| 2007/0253828 A1 * | 11/2007 | Masserey | F01D 5/16 416/230 |
| 2009/0053068 A1 | 2/2009 | Hardwicke et al. | |
| 2011/0194943 A1 * | 8/2011 | Mayer | F01D 5/187 416/97 R |
| 2012/0027616 A1 * | 2/2012 | Merrill | B22C 9/04 416/241 B |
| 2014/0079529 A1 | 3/2014 | Kareff et al. | |
| 2015/0118062 A1 * | 4/2015 | Pierre | F01D 25/12 416/96 R |
| 2016/0084089 A1 * | 3/2016 | Blaney | F01D 25/12 415/115 |
| 2016/0258440 A1 | 9/2016 | Henry | |
| 2017/0067348 A1 | 3/2017 | Kareff et al. | |
| 2018/0052039 A1 | 2/2018 | Van Duyn et al. | |

\* cited by examiner

TURBINE BLADE WITH FRICTION AND IMPACT VIBRATION DAMPING ELEMENTS

The invention was made under a U.S. Government contract DOE Contract Number DE-FE0031613 and the Government has rights herein.

TECHNICAL FIELD

The disclosure relates generally to damping vibration in an article. Further, the disclosure relates to the damping of blades used in turbines.

BACKGROUND

Turbine and compressor sections within an axial flow turbine system generally include a rotor assembly comprising a rotating disk and a plurality of rotor blades circumferentially disposed around the disk. Each blade includes a base, an airfoil, and a platform positioned in the transition area between the base and the airfoil. The bases of the blades are received in complementary shaped recesses within the disk. The platforms of the blades extend laterally outward and collectively form a flow path for fluid passing through the rotor stage. The forward edge of each blade is generally referred to as the leading edge, and the aft edge as the trailing edge. Forward is defined as being upstream of aft in the gas flow through the system.

One concern in turbine operation is the tendency of the turbine blades to undergo vibrational stress during operation. For example, variations in gas temperature, pressure, and/or density can excite vibrations throughout the rotor assembly, especially within in the blade airfoils. In many installations, frequent acceleration and deceleration of the turbine subjects the blades, momentarily at least, to vibrational stresses at certain primary frequencies and, in many cases, to vibrational stresses at secondary or tertiary frequencies. During full-speed, full-load steady state operation conditions, turbine blades also often undergo vibrational stress as they are excited by the periodic, or "pulsating," force from the upstream flow. When a blade is subjected to vibrational stress, its amplitude of vibration can readily build up to a point which may alter operations.

Blades can be damped to avoid or reduce high vibratory stress. One approach to address vibrations during operation of the turbine includes changing natural frequencies of the blades to avoid resonance, e.g., by changing the physical structure of the blades. For example, a mid-span shroud that couples adjacent blades may be used. In another example, tip shrouds may create friction between adjacent blades to dissipate the kinetic energy during operation. Changing or adding structure creates additional challenges by changing the aerodynamic performance of the blades and by adding weight and/or length.

In another example, it is known that dampers may be attached to an external surface of the airfoil. A recognized disadvantage of adding a damper to an external surface is that the damper is exposed to the harsh, corrosive environment within the engine. As soon as the damper begins to corrode, its effectiveness may be compromised. In addition, the damper may separate from the airfoil because of corrosion.

In other approaches, mechanisms to passively absorb the kinetic energy that creates the vibrations during use are employed. In one example, cavities or, in another example, baffles, may be provided adjacent an outer tip of the blade to absorb pressure variations during operation. In another case, a high pressure airflow may be directed from an upstream position into a leading edge of a blade stage.

BRIEF DESCRIPTION

A first aspect of the disclosure provides a turbine blade including: an airfoil body having an outer tip and a platform; a part-span shroud positioned between the outer tip and the platform of the airfoil body, the part-span shroud having a first opening having a first inner surface, the first opening extending through the airfoil body; a second opening in the airfoil body extending radially outward from the first opening and having a second inner surface; a first elongated vibration-damping element disposed in the first opening; and a second elongated vibration-damping element disposed radially in the second opening, the second elongated vibration-damping element including a free radially outer end and a radially inner end coupled to the first elongated vibration-damping element.

A further aspect of the disclosure provides an article including: an airfoil body having an outer tip and a platform; a part-span shroud positioned between the outer tip and the platform of the airfoil body, the part-span shroud having a first opening having a first inner surface, the first opening extending through the airfoil body; a first elongated vibration-damping element disposed in the first opening and frictionally engaging the first inner surface for frictionally damping vibrations; and a second elongated vibration-damping element disposed radially in a second opening in the airfoil body, the second elongated vibration-damping element having a radially inner end coupled to the first elongated vibration-damping element and a free radially outer end for damping vibrations by impacting a second inner surface of the second opening.

Another aspect of the disclosure provides a method of damping vibration in a turbine blade, the method comprising: damping vibration by friction in a part-span shroud positioned between an outer tip and a platform of an airfoil body of the turbine blade, the part-span shroud having a first opening having a first inner surface and a first elongated vibration-damping element disposed in the first opening and frictionally engaging the first inner surface; and damping vibration by impact of a second elongated vibration-damping element disposed radially in a second opening in the airfoil body, the second elongated vibration-damping element having a radially inner end coupled to the first elongated vibration-damping element and a radially outer end capable of damping vibrations by impacting with an inner surface of the second opening.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within a turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine system or, for example, the flow of air through the combustor or coolant through one of the turbine's component systems. The term "downstream" corresponds to the direction of flow of the fluid, and the term "upstream" refers to the direction opposite to the flow. It is recognized that in an opposed flow configuration, upstream and downstream directions may change depending on where one is in the turbine system. The terms "forward" and "aft," without any further specificity, refer to directions, with "forward" referring to the front end of the turbine system, and "aft" referring to the rearward of the turbine system.

It is often required to describe parts that are at differing radial positions with regard to a center axis. The term "radial" refers to movement or position perpendicular to an axis. In such cases, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine system, e.g., an axis of a rotor thereof.

In addition, several descriptive terms may be used regularly herein, as described below. The terms "first", "second", and "third" may be used interchangeably to distinguish one component from another and are not intended to signify location or importance of the individual components.

Embodiments of the disclosure provide an article or turbine blade with a vibration damping system that includes frictional and impact vibration damping elements. The article or turbine blade may include an airfoil body having an outer tip and a platform; and a part-span shroud positioned between the outer tip and the platform of the airfoil body. The part-span shroud has a first opening having a first inner surface therein. The airfoil body includes a second opening extending radially from the first opening and having a second inner surface. A first elongated vibration-damping element is disposed in the first opening, and a second elongated vibration-damping element is disposed radially in the second opening. The second elongated vibration-damping element includes a free radially outer end and a radially inner end coupled to the first elongated vibration-damping element. The first elongated vibration-damping element frictionally damps vibration, and the second elongated vibration-damping element damps vibration using impact within the second opening. The vibration damping system including the vibration damping elements reduces blade vibration with a simple arrangement and does not add extra mass to the blade so that it does not add additional centrifugal force to the blade root or require a change in blade configuration.

Figure 1:
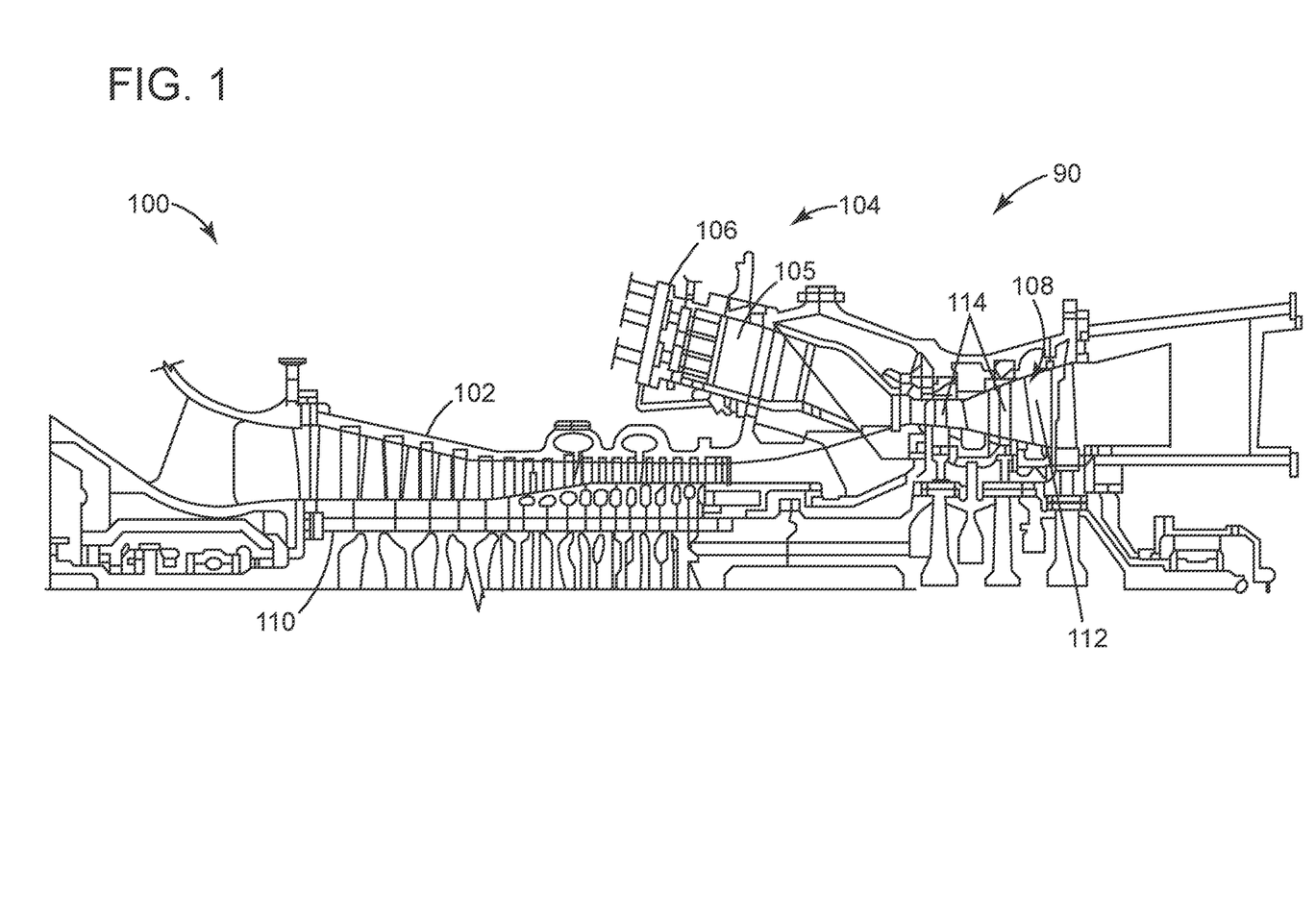
FIG. 1 shows a simplified cross-sectional view of an illustrative turbomachine in the form of a gas turbine system.

Referring to the drawings, FIG. 1 is a schematic view of an illustrative machine including a turbine(s) to which teachings of the disclosure can be applied. In FIG. 1, a turbomachine 90 in the form of a combustion turbine or gas turbine (GT) system 100 (hereinafter, "GT system 100"), is shown. GT system 100 includes a compressor 102 and a combustor 104. Combustor 104 includes a combustion region 105 and a fuel nozzle section 106. GT system 100 also includes a turbine 108 and a common compressor/turbine shaft 110 (hereinafter referred to as "rotor 110").

In one embodiment, GT system 100 is a 7HA.03 engine, commercially available from General Electric Company, Greenville, S.C. The present disclosure is not limited to any one particular GT system and may be implemented in connection with other engines including, for example, the other HA, F, B, LM, GT, TM and E-class engine models of General Electric Company and engine models of other companies. More importantly, the teachings of the disclosure are not necessarily applicable to only a turbine in a GT system and may be applied to practically any type of turbine, e.g., steam turbines, jet engines, compressors (as in FIG. 1), turbofans, turbochargers, etc. Hence, reference to turbine 108 of GT system 100 is merely for descriptive purposes and is not limiting.

Figure 2:
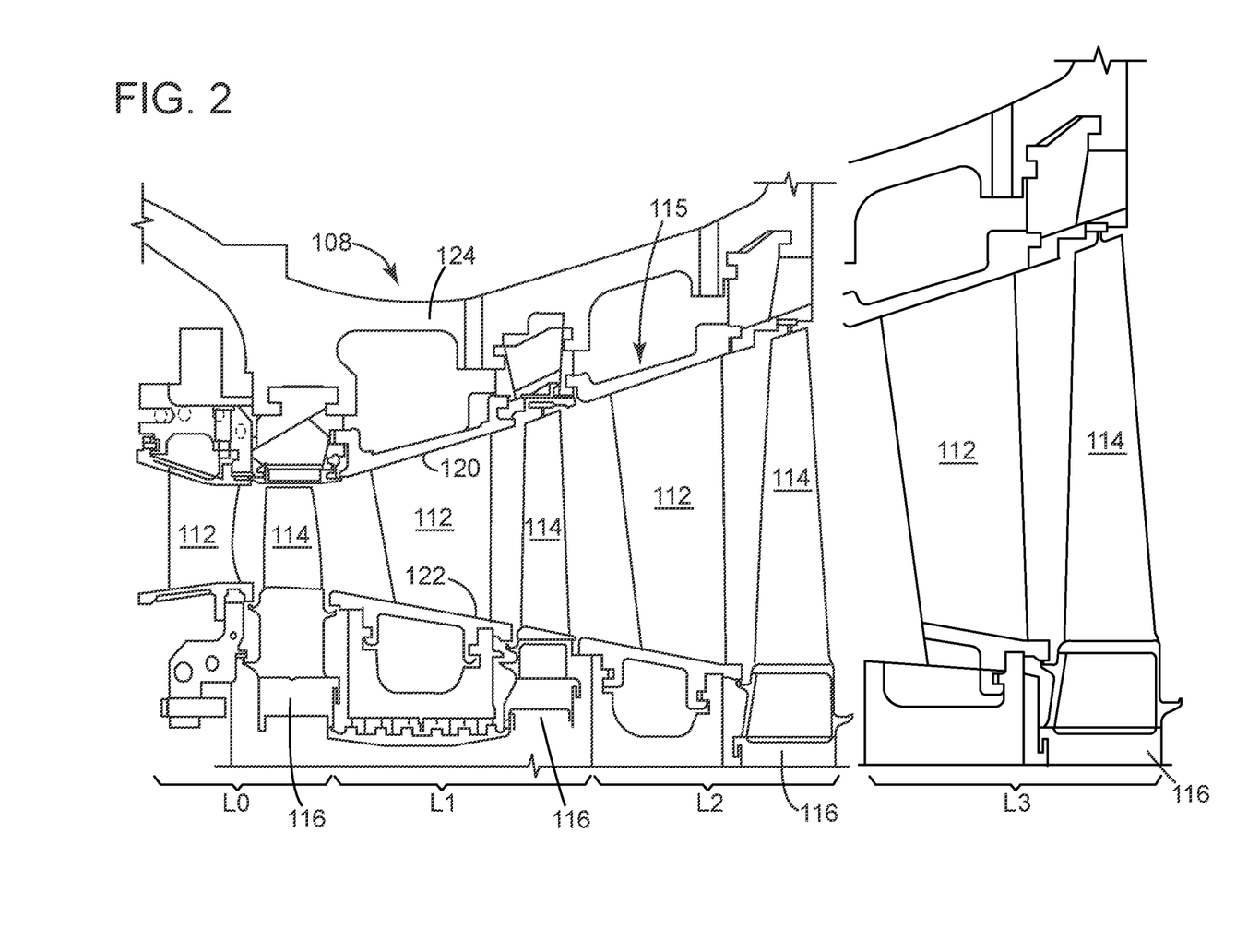
FIG. 2 shows a cross-sectional view of a portion of an illustrative turbine, according to embodiments of the disclosure.

FIG. 2 shows a cross-sectional view of an illustrative portion of turbine 108. In the example shown, turbine 108 includes four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is disposed adjacent the first stage L0 in an axial direction. Stage L2 is the third stage and is disposed adjacent the second stage L1 in an axial direction. Stage L3 is the fourth, last stage and is the largest (in a radial direction). It is to be understood that four stages are shown as one example only, and each turbine may have more or less than four stages.

A plurality of stationary vanes or nozzles 112 may cooperate with a plurality of rotating turbine blades 114 (hereafter "blades 114") to form each stage L0-L3 of turbine 108 and to define a portion of a working fluid path through turbine 108. Blades 114 in each stage are coupled to rotor 110 (FIG. 1), e.g., by a respective rotor wheel 116 that couples them circumferentially to rotor 110 (FIG. 1). That is, blades 114 are mechanically coupled in a circumferentially spaced manner to rotor 110, e.g., by rotor wheels 116. A static nozzle section 115 includes a plurality of stationary nozzles 112 circumferentially spaced around rotor 110 (FIG. 1). Each nozzle 112 may include at least one endwall (or platform) 120, 122 connected with airfoil 124. In the example shown, nozzle 112 includes a radially outer endwall 120 and a radially inner endwall 122. Radially outer endwall 120 couples nozzle(s) 112 to a stationary casing 124 of turbine 108.

With reference to FIGS. 1 and 2, in operation, air flows through compressor 102, and pressurized air is supplied to combustor 104. Specifically, the pressurized air is supplied to fuel nozzle section 106 that is integral to combustor 104. Fuel nozzle section 106 is in flow communication with combustion region 105. Fuel nozzle section 106 is also in flow communication with a fuel source (not shown in FIG. 1) and channels fuel and air to combustion region 105. Combustor 104 ignites and combusts fuel. Combustor 104 is in flow communication with turbine 108 within which gas stream thermal energy is converted to mechanical rotational energy by directing the combusted fuel, e.g., working fluid, into the working fluid path to turn blades 114. Turbine 108 is rotatably coupled to and drives rotor 110. Compressor 102 is rotatably coupled to rotor 110. At least one end of rotor 110 may extend axially away from compressor 102 or turbine 108 and may be attached to a load or machinery (not shown), such as, but not limited to, a generator, a load compressor, and/or another turbine.

Figure 3:
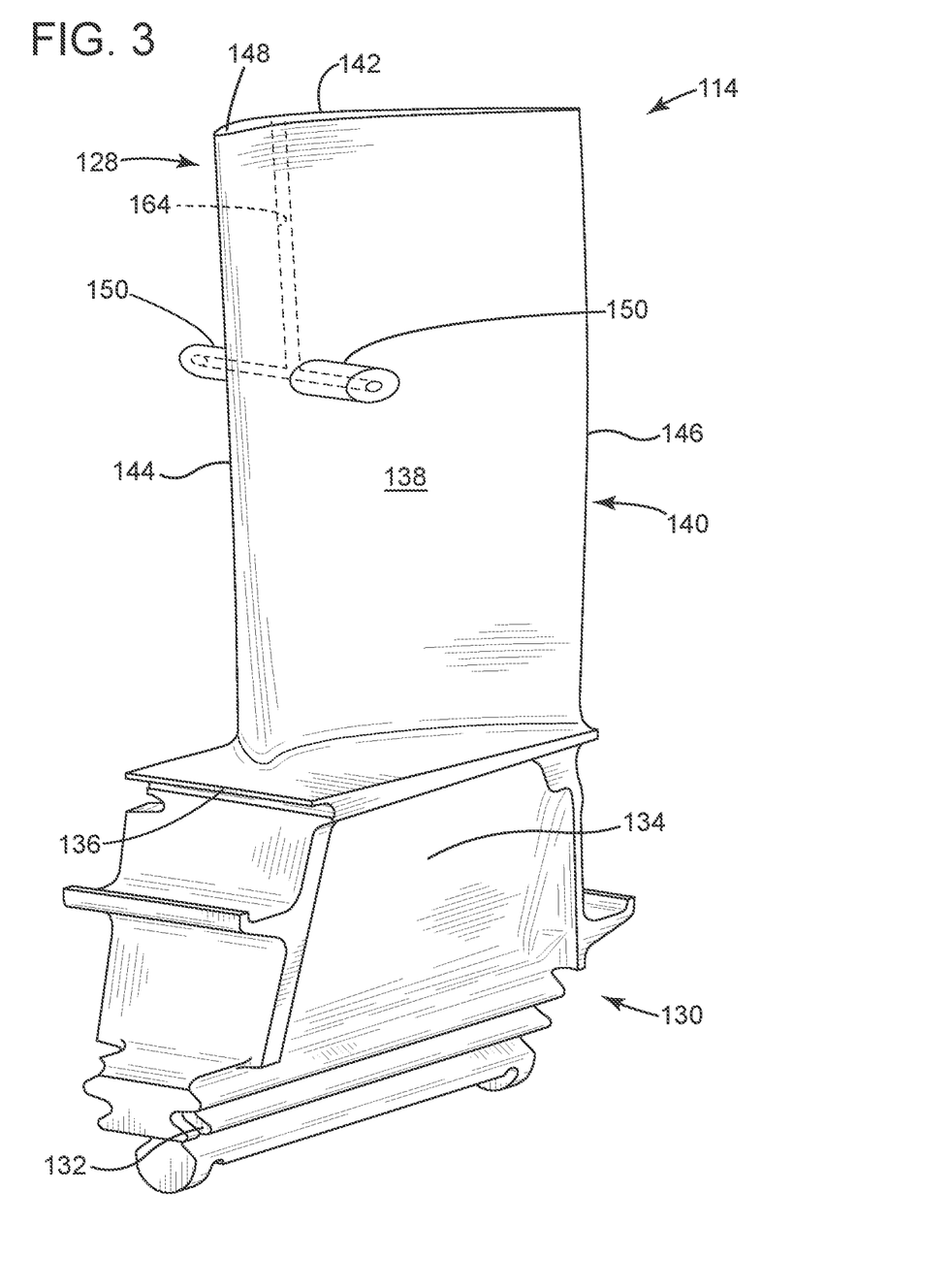
FIG. 3 shows a perspective view of a turbine blade including a blade vibration-damping system, according to embodiments of the disclosure.
Figure 4:
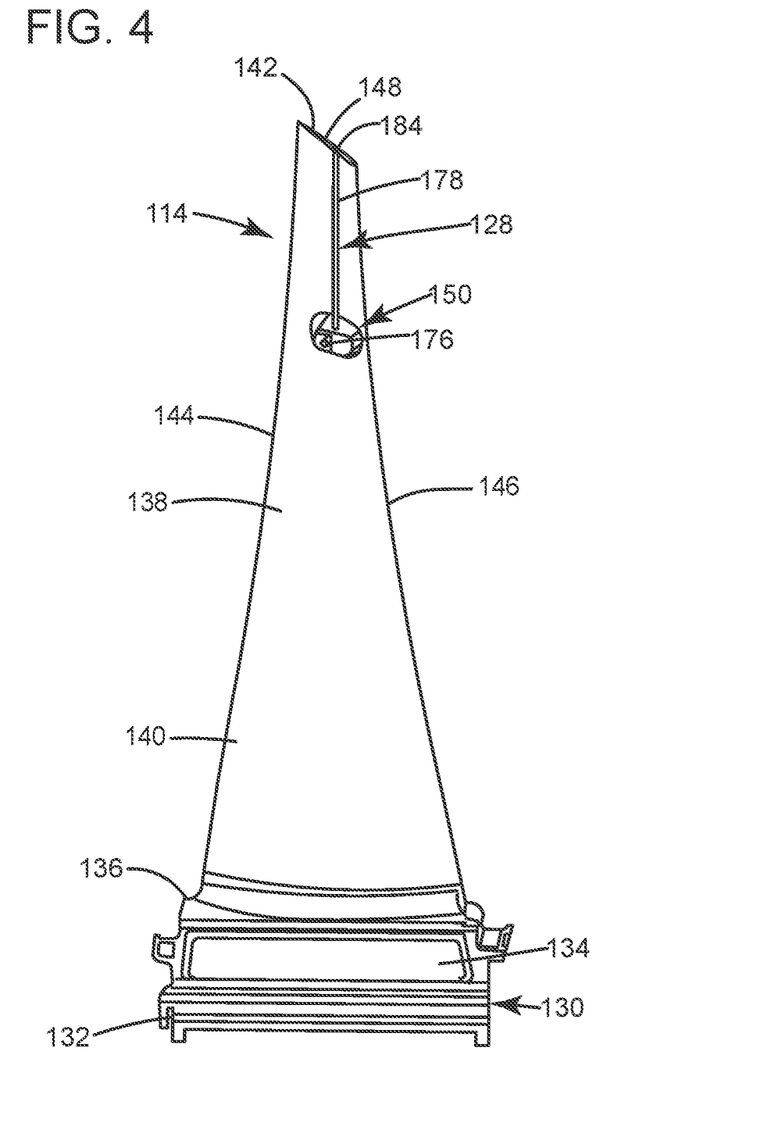
FIG. 4 shows a side view of a turbine blade including a blade vibration-damping system, according to embodiments of the disclosure.

FIGS. 3 and 4 show perspective and side views, respectively, of a blade 114 of the type for which embodiments of a vibration damping system 128 of the present disclosure may be employed. Each of the plurality of blades 114 includes a root or base 130 by which blade 114 attaches to rotor 110 (FIG. 1). Base 130 may include a dovetail 132 configured for mounting in a corresponding dovetail slot in the perimeter of a rotor wheel 116 (FIG. 2) of rotor 110 (FIG. 1). Base 130 may further include a shank 134 that extends between dovetail 132 and a platform 136, which is disposed at the junction of airfoil body 138 and base 130 and which defines a portion of the inboard boundary of the working fluid path (FIG. 2) through turbine 108. It will be appreciated that airfoil body 138 is the active component of blade 114 that intercepts the flow of working fluid and that induces rotor 110 (FIG. 1) to rotate. It will be seen that airfoil body 138 of blade 114 includes a concave pressure side (PS) outer wall 140 and a circumferentially or laterally opposite convex suction side (SS) outer wall 142 extending axially between opposite leading and trailing edges 144, 146, respectively. Sidewalls 140 and 142 also extend in the radial direction from platform 136 to an outer tip 148. Hence, airfoil body 138 extends from platform 136 to outer tip 148.

Blade 114 may also include a part-span shroud 150 extending from each outer wall 140, 142. Part-span shroud 150 is positioned radially between outer tip 148 and platform 130 of airfoil body 138, i.e., radially outboard of platform 136. As understood, part-span shrouds 150 may be located along a radial span of blade 114 and may interact or mate with a part-span shroud 150 of an adjacent blade to, among other things, reduce vibrations in each blade 114. In one example, part-span shroud 150 is positioned more than half way radially outboard on airfoil body 138 from platform 136 so as to be closer to outer tip 148 than to platform 136, which is especially advantageous on longer blades to provide increased vibration damping near outer tip 148. However, part-span shroud 150 may be positioned at any radial location between outer tip 148 and platform 136. While an illustrative blade 114 has been described, it will be appreciated that blades may vary in structure across different types of turbines.

As noted, during operation of a turbine, blades 114 may be excited into vibration by a number of different forcing functions. Variations in, for example, working fluid temperature, pressure, and/or density, can excite vibrations throughout the rotor assembly, especially within the blade airfoils and/or outer tips. Gas exiting upstream of the turbine and/or compressor sections in a periodic, or "pulsating," manner can also excite undesirable vibrations. Embodiments of the disclosure aim to reduce the vibration of a large rotating turbine blade 114 without significant change of blade design.

Figure 5:
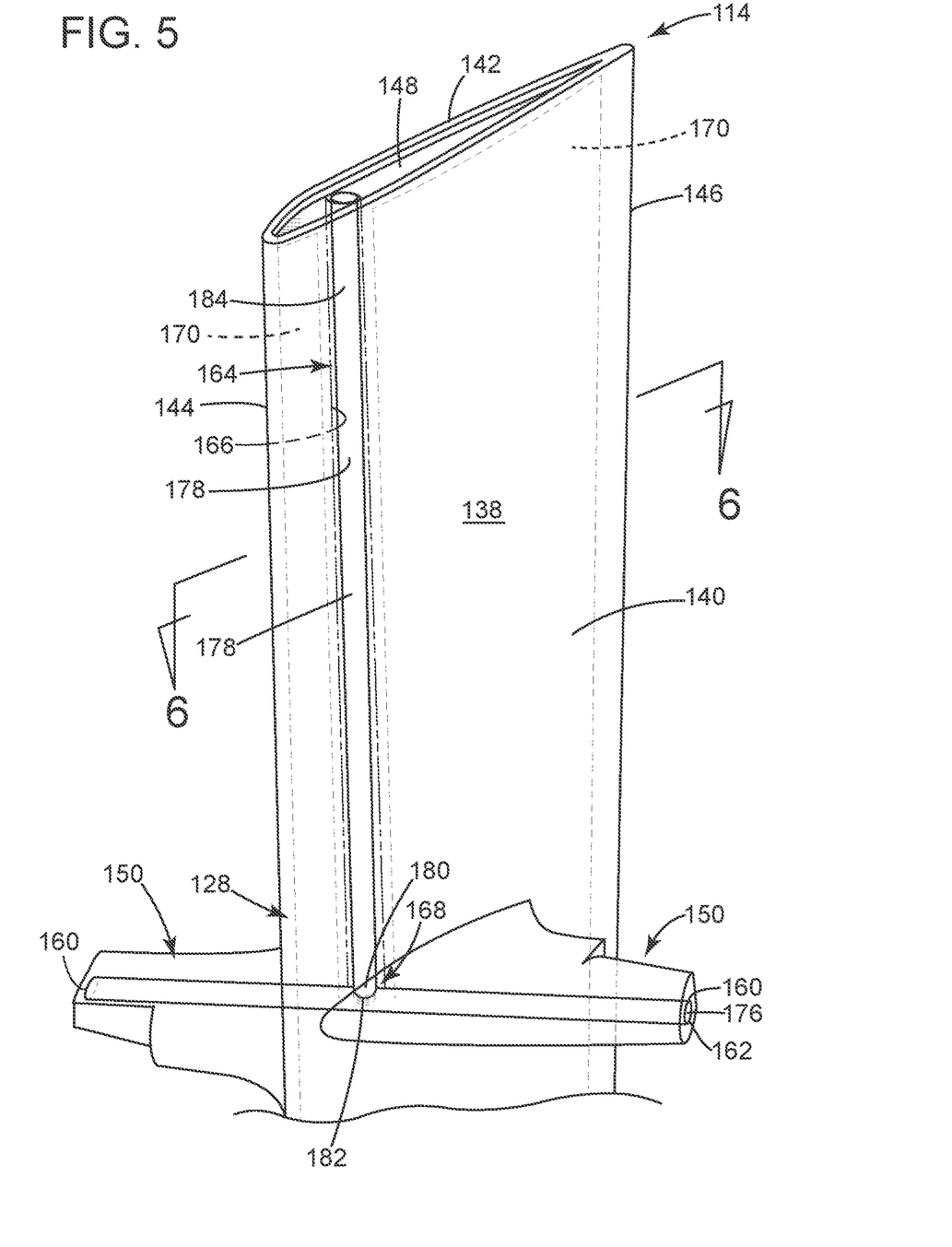
FIG. 5 shows an enlarged perspective view of a turbine blade including a blade vibration-damping system, according to embodiments of the disclosure.
Figure 6:
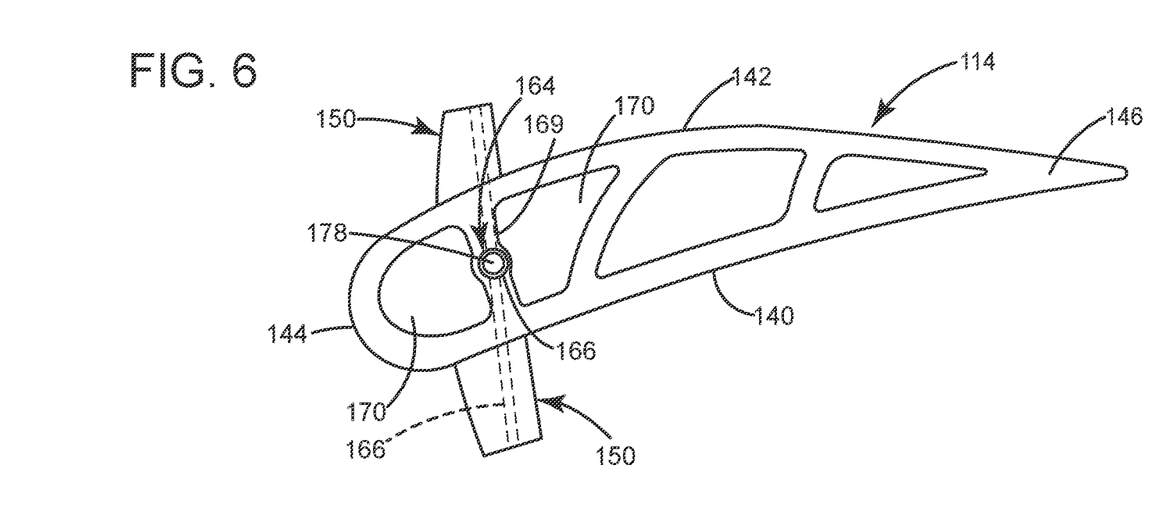
FIG. 6 shows a cross-sectional view of a turbine blade along line 6-6 in FIG. 5, according to embodiments of the disclosure.

FIG. 5 shows an enlarged perspective view of blade 114 in the vicinity of part-span shroud 150 and including outer tip 148, and FIG. 6 shows a top down, cross-sectional view of blade 114 along view line 6-6 in FIG. 5. As noted, part-span shroud 150 is positioned between outer tip 148 and platform 136 (FIG. 3) of airfoil body 138. Typically, part-span shroud 150 is a solid material or includes small cooling passages therein. In accordance with embodiments of the disclosure, part-span shroud 150 includes a first opening 160 having a first inner surface 162. First opening 160 extends in a substantially linear fashion along most, if not all, of a longitudinal length of part-span shroud 150 and extends through the airfoil body 138. Blade 114 also includes a second opening 164 in airfoil body 138 extending radially outward from first opening 160 and having a second inner surface 166. Second opening 164 opens to and is aligned with first opening 160. That is, first and second opening 160, 164 intersect one another, e.g., at a radial outer extent 168 (FIG. 5) of first opening 160. The user may define the location along a length of first opening 160 where the two openings meet, e.g., based on desired vibration damping and/or airfoil body 138 internal structure. First and second openings 160, 164 may be formed using any now known or later developed technique, e.g., machining (such as drilling), additive manufacture, etc.

Second opening 164 may be positioned in a number of ways in airfoil body 138. In one example, as shown in FIG. 3, airfoil body 138 may include a solid block of material in which case second opening 164 extends radially within the block of material. In another example, shown in FIG. 6, airfoil body 138 includes an internal rib or wall 169 defining an elongated internal cavity 170 extending inwardly from outer tip 148 of airfoil body 138. As appreciated in the field, internal wall 169 and elongated internal cavity 170 can take a variety of forms to provide the desired structural integrity to blade 114 and/or the desired coolant delivery to keep the blade cool. In the example shown in FIG. 6, second opening 164 extends radially within internal wall 170. Because the internal structure of blades 114 can vary significantly, it will be appreciated that second opening 164 may extend in a variety of alternative internal structures in blade 114 other than those illustrated.

Vibration damping system 128 and blade 114 may also include a first elongated vibration-damping element 176 disposed in first opening 160, and a second elongated vibration-damping element 178 disposed radially in second opening 164. First elongated vibration-damping element 176 (hereinafter "first damping element 176") engages at least a portion of first inner surface 162 of first opening 160, allowing first damping element 176 to damp vibrations through frictional engagement with first inner surface 162 of first opening 160. The extent of frictional engagement between first damping element 176 and first inner surface 162 can be user defined to provide any desired amount of frictional damping.

Second elongated vibration-damping element 178 (hereinafter "second damping element 178") includes a radially inner end 180 (FIG. 5) coupled to first damping element 176, i.e., near intersection of openings 160, 164. Consequently, first damping element 176 and second damping element 178 may collectively have an upside-down T shape in airfoil body 138. The T shape may or may not be symmetrical, depending on the location of the second opening 164. Second damping element 178 may be coupled to first damping element 176 in a number of ways. In one embodiment, radially inner end 180 of second damping element 178 is threadably coupled in an opening 182 (FIG. 5) in first damping element 176. In alternative embodiments, they may be fastened together in any manner with sufficient strength to prevent radial movement of second damping element 178, e.g., press fit.

Figure 7:
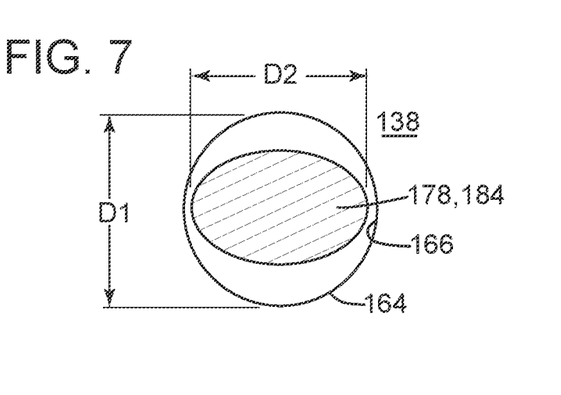
FIG. 7 shows a cross-sectional view of an elongated vibration-damping element, according to embodiments of the disclosure.

Second damping element 178, however, is not frictionally engaged within second opening 164. Rather, second damping element 178 is free to move within second opening 164 and, in particular, includes a free radially outer end 184 that is unencumbered other than by second opening 164 to impact inner surface 166, i.e., to vibrate, within second opening 164. In this regard, as shown for example in a cross-sectional view in FIG. 7, second opening 164 may have a dimension D1 greater than a corresponding outer dimension D2 of second damping element 178. This structure allows second damping element 178 a limited movement range within second opening 164 for damping vibrations through impact with second inner surface 166 of second opening 164, and allowing fastening of second damping element 178 to first damping element 176. The amount of movement allowed can be user defined to provide any desired amount of impact damping. In one non-limiting example, dimension D1 of second opening 164 may be 1.8 centimeters (0.7 inch), and a largest dimension D2 of second damping element 178 may be 1.6 centimeters (0.6 inch). The spacing between second opening 164 and second damping element 178 need not be consistent around the element 178 and can vary depending on a number of factors such as, but not limited to, the anticipated direction of vibration, the amount of vibration, etc. In any event, the dimensions D1, D2 allow sufficient space to allow fastening of second damping element 178 to first damping element 176, e.g., rotation for threading, spacing for press fit, etc.

Figure 8:
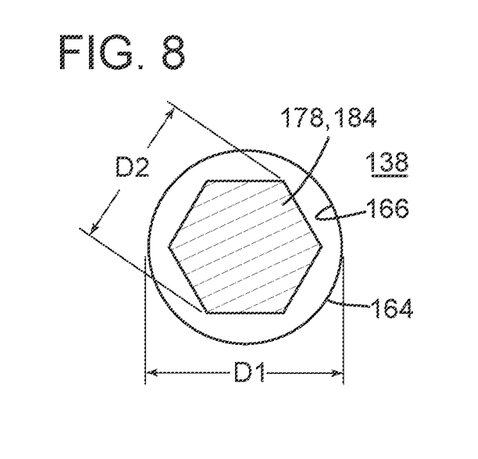
FIG. 8 shows a cross-sectional view of an elongated vibration-damping element, according to other embodiments of the disclosure.

First and second damping elements 176, 178 may be made of the same material as airfoil body 138, e.g., a superalloy, or they may be made of other materials. In any event, damping elements 176, 178 are typically configured to add as little additional mass as possible. While openings 160, 164 and damping elements 176, 178 are illustrated with either a circular or elliptical/oval (FIG. 7) cross-section, it is emphasized that either element can have practically any desired cross-section, including in addition to those shown, polygonal cross-sections (as in FIG. 8). Hence, damping element 176 or 178 may take the form of a rod or pin of any desired cross-sectional shape. In one embodiment, second opening 164 has a circular cross-sectional shape, and second damping element 178 has a cross-sectional shape selected from the group consisting of a circle (FIG. 6), an ellipse having a major and a minor axis of different lengths (FIG. 7), and a polygon (FIG. 8). As noted, second opening 164 has sufficient width to allow second damping element 178 to allow fastening, e.g., turning for threading, into first damping element 176 regardless of cross-sectional shape.

Openings 160, 164 and damping elements 176, 178 can be customized to provide the desired damping according to a wide variety of factors such as, but not limited to: anticipated vibration magnitude and/or direction, blade size, blade internal structure, existence of a tip shroud, and/or part-span shroud 150 size and/or shape. Damping elements 176, 178 can be inserted into openings 160, 164 in any manner. For example, first damping element 176 may be forcibly and frictionally fit into first opening 160, while second damping element 178 can be inserted into second opening 164 through outer tip end 148 and coupled to first damping element 176, e.g., by turning element 178 to thread end 180 into first damping element 176. Second damping element 178 may be inserted into second opening 164, for example, prior to closing of outer tip end 148 with a tip plate and/or tip rail (not shown).

Embodiments of the disclosure also provide a method of damping vibration in a turbine blade 114, i.e., using damping vibration system 128. In operation, turbine blade 114 is operated in a normal fashion within turbine 108 (FIG. 2). However, damping vibration by friction is carried out in part-span shroud 150 positioned between outer tip 148 and platform 136 of airfoil body 138 of turbine blade 114 by frictional engagement of first damping element 176 in first opening 160. As noted, first opening 160 has first inner surface 162 in which first damping element 176 is disposed such that first damping element 176 frictionally engages first inner surface 162 of first opening 160. Simultaneously or contemporaneously, damping vibration is carried out by impact of second damping element 178 disposed radially in second opening 164 in airfoil body 138. As noted, second damping element 178 has radially inner end 180 coupled to first damping element 176 and radially outer end 184 capable of damping vibrations by impacting with inner surface 166 of second opening 164.

While embodiments of the disclosure have been described herein as a blade that is part of a turbine, it is noted that the teachings of the disclosure may be applied to a variety of other applications for an article including an airfoil.

Embodiments of the disclosure provide two different damping mechanisms combined in a T-shaped pin design. First damping element 176, which is generally horizontal, dissipates the energy by friction with inner surface 162 of first opening 160, and second damping element 178, which is radially extending, dissipates the energy by impact with inner surface 166 of second opening 164. Embodiments of the disclosure thus retain blade 114 pull load and the original configuration of the blade and rotor, while reducing the blade flex vibration effectively and with a simple design.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise. "Approximately" as applied to a particular value of a range applies to both values and, unless otherwise dependent on the precision of the instrument measuring the value, may indicate+/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure.

What is claimed is:

1. A turbine blade, comprising:
   an airfoil body having an outer tip and a platform;
   a part-span shroud positioned between the outer tip and the platform of the airfoil body, the part-span shroud having a first opening having a first inner surface, the first opening extending through the airfoil body;
   a second opening in the airfoil body extending radially outward from the first opening and having a second inner surface;
   a first elongated vibration-damping element disposed in the first opening; and
   a second elongated vibration-damping element disposed radially in the second opening, the second elongated vibration-damping element including a free radially outer end and a radially inner end coupled to the first elongated vibration-damping element.

2. The turbine blade of claim 1, wherein the first elongated vibration-damping element engages at least a portion of the first inner surface of the first opening, allowing the first elongated vibration-damping element to damp vibrations through frictional engagement with the first inner surface of the first opening.

3. The turbine blade of claim 1, wherein the second opening has a dimension greater than a corresponding outer dimension of the second elongated vibration-damping element, allowing the second elongated vibration-damping element a limited movement range within the second opening for damping vibrations through impact with the second inner surface of the second opening.

4. The turbine blade of claim 3, wherein the first elongated vibration-damping element engages at least a portion of the first inner surface of the first opening, allowing the first elongated vibration-damping element to damp vibrations through frictional engagement with the first inner surface of the first opening.

5. The turbine blade of claim 1, wherein the airfoil body includes an internal wall defining an elongated internal cavity extending inwardly from the outer tip of the airfoil body, and wherein the second opening extends radially within the internal wall.

6. The turbine blade of claim 1, wherein the first elongated vibration-damping element and the second elongated vibration-damping element collectively have an upside-down T shape in the airfoil body.

7. The turbine blade of claim 1, wherein the radially inner end of the second elongated vibration-damping element is threadably coupled in an opening in the first elongated vibration-damping element.

8. The turbine blade of claim 1, wherein the part-span shroud is positioned more than half way radially outward on the airfoil body from the platform.

9. The turbine blade of claim 1, wherein the second opening has a circular cross-sectional shape; and wherein the second damping element has a cross-sectional shape selected from the group consisting of a circle, an ellipse having a major and a minor axis of different lengths, and a polygon.

10. An article, comprising:
    an airfoil body having an outer tip and a platform;
    a part-span shroud positioned between the outer tip and the platform of the airfoil body, the part-span shroud having a first opening having a first inner surface, the first opening extending through the airfoil body;
    a first elongated vibration-damping element disposed in the first opening and frictionally engaging the first inner surface for frictionally damping vibrations; and
    a second elongated vibration-damping element disposed radially in a second opening in the airfoil body, the second elongated vibration-damping element having a radially inner end coupled to the first elongated vibration-damping element and a free radially outer end for damping vibrations by impacting a second inner surface of the second opening.

11. The article of claim 10, wherein the second opening has a dimension greater than a corresponding outer dimension of the second elongated vibration-damping element, allowing the second elongated vibration-damping element a limited movement range within the second opening for damping vibrations by impacting the second inner surface of the second opening.

12. The article of claim 10, wherein the airfoil body includes an internal wall defining an elongated internal cavity extending inwardly from the outer tip of the airfoil body, and wherein the second opening extends radially within the internal wall.

13. The article of claim 10, wherein the first elongated vibration-damping element and the second elongated vibration-damping element collectively have an upside-down T shape in the airfoil body.

14. The article of claim 10, wherein the radially inner end of the second elongated vibration-damping element is threadably coupled in an opening in the first elongated vibration-damping element.

15. The article of claim 10, wherein the part-span shroud is positioned more than half way radially outward on the airfoil body from the platform.

16. The article of claim 10, wherein the second opening has a circular cross-sectional shape; and wherein the second damping element has a cross-sectional shape selected from the group consisting of a circle, an ellipse having a major and a minor axis of different lengths, and a polygon.

17. The article of claim 10, wherein the article includes a turbine blade in a turbine.

18. A method of damping vibration in a turbine blade, the method comprising:
    damping vibration by friction in a part-span shroud positioned between an outer tip and a platform of an airfoil body of the turbine blade, the part-span shroud having a first opening having a first inner surface and a first elongated vibration-damping element disposed in the first opening and frictionally engaging the first inner surface; and
    damping vibration by impact of a second elongated vibration-damping element disposed radially in a second opening in the airfoil body, the second elongated vibration-damping element having a radially inner end coupled to the first elongated vibration-damping element and a radially outer end capable of damping vibrations by impacting with an inner surface of the second opening.

19. The method of claim 18, wherein the airfoil body includes an internal wall defining an elongated internal cavity extending inwardly from the outer tip of the airfoil body, and wherein the second opening extends radially within the internal wall.

20. The method of claim 18, wherein the first elongated vibration-damping element and the second elongated vibration-damping element collectively have an upside-down T shape in the airfoil body.

* * * * *